United States Patent [19]
Bellac

[11] Patent Number: 5,384,489
[45] Date of Patent: Jan. 24, 1995

[54] WIND-POWERED ELECTRICITY GENERATING SYSTEM INCLUDING WIND ENERGY STORAGE

[76] Inventor: Alphonse H. Bellac, 461 Old Stamford Rd., New Canaan, Conn. 06840

[21] Appl. No.: 192,432

[22] Filed: Feb. 7, 1994

[51] Int. Cl.⁶ .................. F05D 9/02; F22B 1/28
[52] U.S. Cl. .......................... 290/44; 60/659; 290/55
[58] Field of Search ............ 290/44, 55; 60/659

[56] References Cited

U.S. PATENT DOCUMENTS

| | | | |
|---|---|---|---|
| 2,332,294 | 10/1943 | Bohmfalk | 290/55 |
| 4,204,126 | 5/1980 | Diggs | 290/55 |
| 4,206,608 | 6/1980 | Bell | 290/55 |
| 4,229,661 | 10/1980 | Mead et al. | 290/44 |
| 4,230,531 | 10/1980 | Fernandopulle | 290/1 R |
| 4,236,083 | 11/1980 | Kenney | 290/55 |
| 4,447,738 | 5/1984 | Allison | 290/55 |
| 4,455,834 | 6/1984 | Earle | 60/659 |
| 4,479,352 | 10/1984 | Yamaoka et al. | 60/659 |
| 5,133,191 | 7/1992 | Bruhn et al. | 60/659 |

FOREIGN PATENT DOCUMENTS

| | | | |
|---|---|---|---|
| 140870 | 6/1988 | Japan | 290/55 |
| 8005063 | 4/1982 | Netherlands | |
| 9214054 | 8/1992 | WIPO | |

Primary Examiner—A. D. Pellinen
Assistant Examiner—Robert Lloyd Hoover
Attorney, Agent, or Firm—St. Onge Steward Johnston & Reens

[57] ABSTRACT

The invention provides a wind-powered electricity generating system including a wind energy storage and recovery device. The wind energy storage and recovery device includes a wind-powered electricity generator (not necessarily a system of the invention), a heater operable with electricity from the generator, thermal fluid heated by the heater, a tank to store the heated fluid, and a stored heat energy extractor. In addition to the storage and recovery device, the system of the invention also includes blades mounted to rotate a shaft of a wind-powered generator in response to the wind to create electricity, and switch means actuable in response to the amount of electricity created by the generator for applying electricity to the heater. In another aspect the invention relates to a method for storing wind energy.

20 Claims, 1 Drawing Sheet

WIND-POWERED ELECTRICITY GENERATING SYSTEM INCLUDING WIND ENERGY STORAGE

FIELD OF THE INVENTION

The invention relates to a wind-powered electricity generating system for use for example by towns and villages off the utility grid instead of burning fossil fuels. The system stores wind energy for use to generate electricity during periods of low wind speed.

BACKGROUND OF THE INVENTION

Wind-powered electricity generators are known in the art. Prior art systems are interconnected to utility grids and are used to displace more expensive fossil fuel generation when the wind reaches a minimum speed. This minimum speed may be relatively high since utility grids are generally high power systems not capable of efficiently utilizing low-level supplemental power sources. So, much of the electricity capable of being generated by utility grid-interconnected systems disadvantageously goes unused.

Prior art, off-grid, wind electrical power systems, such as may be used in remote towns or villages, are typically used in combination with a fossil fuel baseload generator such as diesel engine, which essentially replaces the utility grid, and is supplemented by wind-generated electricity on an as available basis. Towns and villages which are off-grid are typically in remote locations with extremes of weather so that necessary reliance on shipments of fossil fuel is disadvantageous.

Many electricity users, especially in remote locations, would prefer to generate their electricity entirely with renewable resources such as the wind instead of with fossil or nuclear fuels, the recovery, spillage and effluent of which may adversely impact the environment. The intrinsic variability of wind energy, however, makes reliance solely on the wind for electricity problematic. Several prior art wind power systems have sought to alleviate this problem by storing wind energy for use in generating electricity during periods when the wind does not blow hard enough to meet demand for electricity.

U.S. Pat. Nos. 4,229,661, 4,447,738 and 4,455,834 disclose systems for storing wind energy as compressed air. The windmills operate compressors. An air motor or turbine is used in the '661 and '738 patents to generate electricity from the compressed air during periods of low wind speed. In the '834 patent, air is compressed to the extent it may be stored as a liquid in a cryogenic tank.

U.S. Pat. Nos. 4,204,126 and 4,206,608 disclose systems for storing wind energy with hydraulic fluid in pressure tanks ('608 patent) and columns ('126 patent). A disadvantage of pressure tank and column storage systems is the relative expense and difficulty of installing and maintaining a pressurized system. Electricity generating systems are preferably highly reliable and maintenance free.

U.S. Pat. No. 4,236,083 discloses a windmill having an air brake driven through a speed increaser. Air is heated by agitating it in a closed path around the brake. The heat is used or stored in rock. A disadvantage of this device is that energy storage is achieved by deliberate friction between, and wear of, device components, requiring a high level maintenance and reducing reliability.

U.S. Pat. Nos. 5,133,191 and 4,479,352 disclose hot liquid storage systems for cogenerating electricity from waste heat with steam turbines. The waste heat is collected from stack gas or industrial exhaust. Cogeneration systems are not practical for use to provide electricity to remote towns and villages since there are not likely to be industrial plants in these areas. A further disadvantage to use of these systems is that the effluent used to heat the liquid was created by burning fossil or nuclear fuel.

What is desired therefore is a wind-powered electricity generating system which is capable of storing wind energy for use during periods of low wind speed and/or high demand, and which is simple in construction, low in maintenance, and reliable in use. An electricity generating system designed for operation without dependence on fossil or nuclear fuel is also desired.

SUMMARY OF THE INVENTION

Accordingly, it is an object of the invention to provide a device which uses wind power to generate electricity and which is capable of storing wind energy for use during low wind speed and/or high demand periods.

A further object of the invention is a device of the above character for generating electricity without burning fossil or nuclear fuel.

Another object of the invention is a device of the above character in which wind power is stored in heated liquid.

Yet another object of the invention is a device of the above character in which the liquid is heated by an electric heater powered by electricity generated with wind energy.

Still a further object of the invention is to provide a device of the above character for generating both alternating and direct current electricity.

These and other objects of the invention are achieved by provision of a wind-powered electricity generating system including a wind energy storage and recovery device. The wind energy storage and recovery device includes a wind-powered electricity generator (not necessarily a system of the invention), a heater operable with electricity from the generator, thermal fluid heated by the heater, a tank to store the heated fluid, and a stored heat energy extractor.

The heat extractor may be used to remove stored heat energy from the tank to provide space heating/cooling, refrigeration, or desalinization, but preferably is used to create steam for generating electricity.

Preferably, the heater is a resistance heater. The wind-powered generator preferably creates alternating current electricity for application to an external load, and most preferably includes first and second wind power collectors. The first collector Is tuned for low speed to create direct current for operating the heater, and the second collector creates alternating current for the load and/or heater.

In addition to the storage and recovery device in its broadest embodiment, the wind-powered electricity generating system of the invention also includes blades mounted to rotate a shaft of the wind-powered generator in response to the wind to create electricity, and switch means actuable in response to the amount of electricity created by the generator for applying electricity to the heater.

If not used in the storage and recovery device, the system preferably also includes a heat exchanger for creating steam with the heated thermal fluid, and a steam-powered electricity generator to create electricity from thermally stored wind energy, for example when wind speed cannot meet load demand.

Preferably, the switch means applies electricity to the resistance heater when the generator is creating excess electricity and most preferably also when the generator is creating less than a usable amount of electricity, e.g. at less than minimum serviceable wind speeds.

In another aspect the invention relates to a method for storing wind energy comprising the steps of converting wind speed to electricity, converting electricity to heat, heating thermal fluid, storing heated thermal fluid, and extracting heat energy from the heated thermal fluid. The method preferably also includes the steps of creating steam with the extracted heat energy, and using the steam to generate electricity. Preferably, the method also includes the step of condensing the steam to create free heat.

The invention and its particular features and advantages will become more apparent from the following detailed description considered with reference to the accompanying drawing.

DETAILED DESCRIPTION OF THE INVENTION

Figure 1:
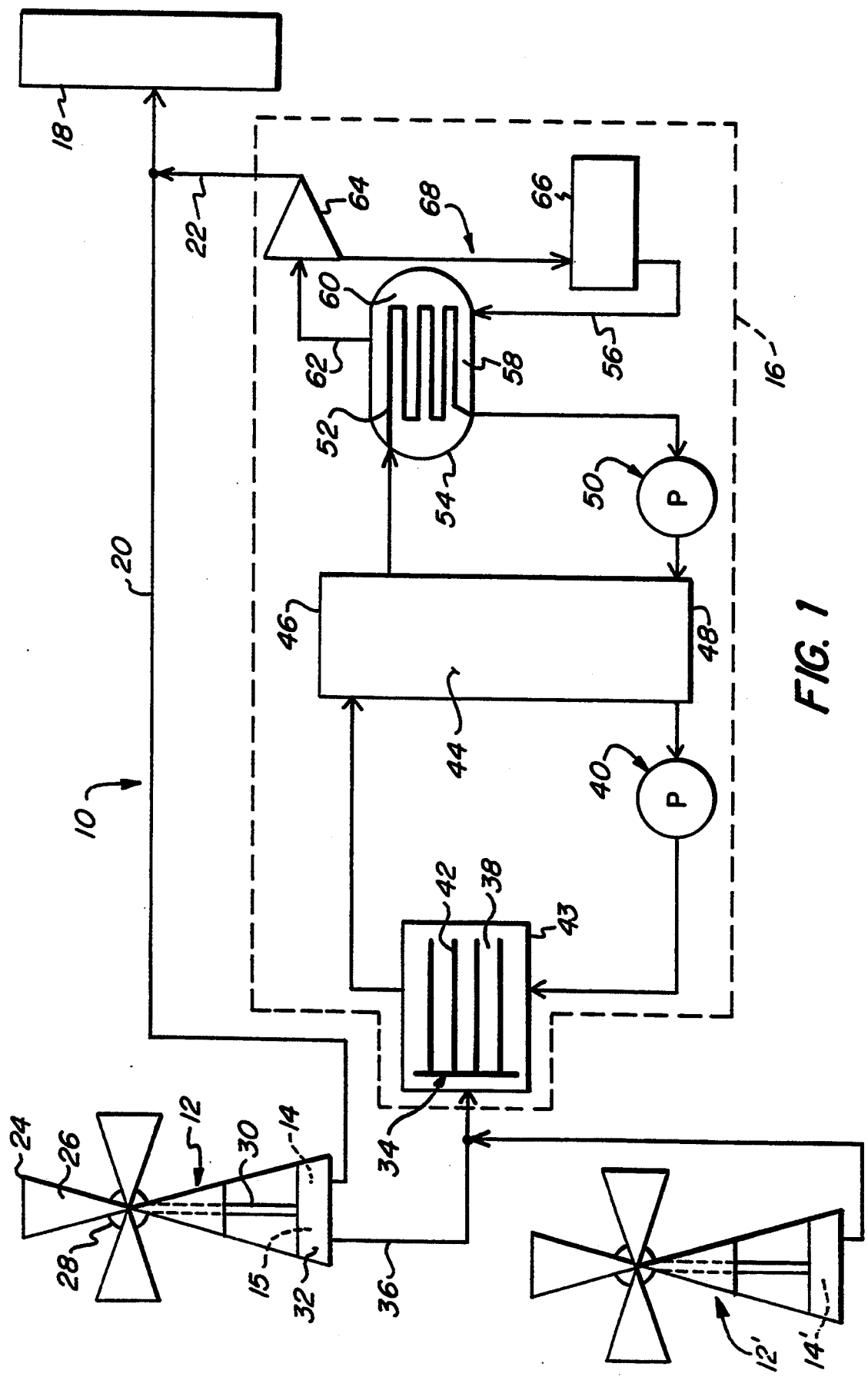
FIG. 1 is a simplified schematic of a wind-powered electricity generator in accordance with the invention.

FIG. 1 depicts a wind-powered electricity generating system 10 in accordance with the invention. System 10 includes a wind energy collector 12, a wind-powered generator 14 and a wind energy storage and recovery device 16. Generator 14 is powered by wind energy collector 12 to provide electricity, preferably alternating current electricity, along line 20 to a load 18. During periods when wind speed falls below a serviceable minimum of between about 3 and 5 meters per second for current state of the art wind energy collectors, and preferably also when the electricity demand of load 18 outstrips the capacity of generator 14, storage device 16 generates additional electricity for application along line 22 to load 18.

The electricity generated by storage device 16 may be used to support the entire demand of load 18 during periods of both low wind speed and low electricity consumption, but is preferably used to supplement the electricity produced by generator 14 either to meet particularly high electricity consumption by load 18 or to meet average electricity demand during periods of less than average wind speeds of about between 5 and 8 meters per second and greater.

Although it may comprise a standard utility grid, load 18 preferably comprises a community or village which is remote from a utility grid, and most preferably also remote or isolated from a fossil fuel supply. Such loads typically have peak electricity demand in the range from about 250 kW to about 3 MW, with most villages requiring 1 MW of peak electrical power.

Designing systems 10 for such villages requires analysis of average wind speeds in addition to average power requirements. Further, correlation of peak demand to wind speed fluctuation must also be undertaken to determine whether wind speed is more likely to be above or below average during periods more likely to have extremely hot or cold weather since demand is likely to be the greatest at these times. It is understood that in some systems 10 in which periods of little or no wind are frequent, or in which low wind speeds are likely during peak demand periods, or simply as a precaution against periods of either extremely high demand or extremely low generation, a back-up fossil fuel generator (not shown) may be used.

Collector 12 may be a windmill 24, a propeller, a turbine, or other mechanical device which preferably converts linear wind speed into rotational energy. It is understood, however, that other types of wind energy collectors may also be used. Windmill 24, as well as a propeller or turbine if used, includes blades 26 mounted to a hub 28. The blades are mounted at a pitch to oncoming wind so as to rotate hub 28 in a well known fashion. Hub 28 is coupled to a generator shaft 30 such that shaft 30 is rotated with rotation of hub 28. This couple (not shown) preferably includes a bevel gear (not shown) and shaft 30 may thus be mounted substantially perpendicular to hub 28. In addition to bevel gears, the couple may also include other gearing which alters the rotational speed of shaft 30, e.g. in order to improve the efficiency of windmill 24 at various wind speeds. Similarly, although not shown, it is understood that blades 26 of windmill may be mechanized to permit automated pitch alteration for improving efficiency at various wind speeds.

Generator 14 creates electricity, preferably alternating current electricity, with rotating generator shaft 30 in a known manner for application to load 18 along line 20. Within generator housing 32 enclosing generator 14 is a switch means 15 which distributes electricity between load 18 and a heating element 42, preferably a resistance heater 34, over line 36. The switch means will distribute electricity to heater 34 when the demand of load 18 is less than the supply created by generator 14. In addition, the switch preferably also applies electricity created by generator 14 to heater 34 when the wind speed drops below the serviceable minimum for efficiently supplying load 18. In such cases either the wind energy storage system would meet load demand over a short period along line 22 or a supplemental fossil fuel or water-powered electricity generating system could be used.

It may be desirable for heater 34 to be operated with direct current electricity. In such a case, either the alternating current electricity created by generator 14 may be rectified, or generator shaft 30 may be used to create both alternating and direct current electricity, or a separate wind collection device 12' and generator 14' may be used to create direct current electricity.

Generally, creating direct current electricity separately may be more efficient than rectifying alternating current electricity, however, creating direct current electricity separately may increase the capital cost, and possibly the maintenance costs of system 10. Which approach is utilized may also depend upon the size and intended location of the system. For example, maximum overall efficiency may be obtained by providing separate wind energy collection devices and generators in which the direct current collection device is tuned for wind speeds below the minimum serviceable wind speed, permitting accumulation in storage and recovery device 16 of the energy in low wind speeds. It is understood that separate wind energy collection devices may be used and desirable whether the heater operates on direct or alternating current. In prior art systems, the energy of low wind speeds may not be used.

Heater 34 adds heat to thermal fluid 38 circulated by pump circuit 40 over heating elements 42 in vessel 43 to store wind energy. Thus, system 10 differs from prior art cogeneration systems which utilize exhaust or waste heat to generate electricity. Fluid 38 may be eutectic salt systems, heat transfer oils, water, or some other synthetic heat transfer fluid which is preferably nonflammable, nontoxic, noncorrosive, and at atmospheric pressure.

Once fluid 38 has been heated, preferably to its maximum permissible temperature, pump circuit 40 adds the heated fluid to an insulated storage tank 44 near a top 46 of the tank. In this regard, pump circuit 40 may be controlled by a thermostat (not shown) located within vessel 43 to monitor the temperature of fluid 38 for controlling the pump circuit when the fluid reaches a preset temperature. It is understood that the pump circuit may include a bypass valve (not shown) so that the pump itself may operate continuously even though heated fluid is not being added to the tank.

Heated fluid is introduced to top 46 of tank 44 and moves downwardly in the tank as it cools and is displaced by hotter fluid from heater 34. Pump circuit 40 removes cooled fluid from near a bottom 48 of tank 44 for application to heater 34.

Wind energy stored as heated thermal fluid may subsequently be used to generate electricity or for other uses during periods of low wind speed and/or high electricity demand in the following manner. A pump circuit 50 withdraws heated thermal fluid from near top 46 of tank 44 and introduces it to a heat exchanger 52. Heat exchanger 52 or the like extracts the stored thermal energy from fluid 38.

This energy may then be applied to any number of uses such as space heating/cooling, desalinization, and/or refrigeration. Preferably, the heat is used to create steam in which case heat exchanger 52 is mounted within a vaporizer chamber 54.

Water 58 is introduced to vaporizer chamber 54 along line 56 and is boiled off as steam 60 with heat from exchanger 52, cooling thermal fluid 38 therein. Cooled thermal fluid 38 is returned to bottom 48 of insulated tank 44 by pump circuit 50. It is understood that the "cooled" thermal fluid is still hot but is cooler than fluid leaving heater vessel 43. Meanwhile, steam 60 is introduced along line 62 to a steam-powered electricity generator 64, steam turbine or the like for creating alternating current applied to load 18 along line 22. Exhaust steam is converted back to water at condenser 66 which radiates free heat for space heating/cooling a low temperature heat user, such as a greenhouse.

Heat exchanger 52, vaporizer chamber 54, steam-powered electricity generator 64 and condenser 66 form a Rankine cycle 68. It is understood that condenser 66 may be replaced by a heat exchanger and vaporizer chamber to power another Rankine cycle or another thermal liquid storage cycle if desired. This second Rankine cycle (not shown) may or may not require additional heat input from thermal fluid 38.

Preferably, wind energy storage and recovery device 16 operates to generate supplemental electricity whenever generator 14 is creating electricity. Thus, pump circuit 50 operates whenever pump circuit 40 is operating. It is understood, however, that pump circuit 50 may be separately controlled in order to generate electricity from thermally stored wind energy for brief periods during which there is substantially no wind. It is also understood, as with pump circuit 40, that pump circuit 50 may include a bypass valve (not shown) so that the pump itself may operate continuously even though cooled fluid is not being returned to the tank.

Although the thermodynamic conversion efficiency of storage and recovery device 16 is low, it is appreciated that no fuel cost is associated with heating fluid 38. Similarly, no electricity is wasted to heat the fluid since heater 34 is preferably only operated when the electricity generated exceeds demand and/or when wind speed falls below the serviceable minimum. Energy storage is also achieved with a relatively simple, inexpensive and maintenance free system.

In use, wind collection device 12 of the system would preferably be sized to satisfy the average electrical load during periods when the wind speed would be approximately equal to or slightly higher than average. With current state of the art wind energy collectors, the system is believed to be most efficient in geographical areas where the average wind speed is between about 8 and 10 meters per second. Storage and recovery device 16 would preferably be provided with a capacity sufficient to dampen the majority of daily wind speed variations which fall below this average. Weekly variations below the average wind speed may require a supplemental generator.

Although the invention has been described with reference to a particular arrangement of parts, features and the like for wind powered electricity generation and wind energy storage, these are not intended to exhaust all possible arrangements or features, and indeed many other modifications and variations will be ascertainable to those of skill in the art including but not limited to use of the system for water-powered electricity generation and moving water energy storage.

What is claimed is:

1. A wind-powered electricity generator system comprising:

blades mounted to rotate a shaft of the generator in response to wind and create electricity;

a resistance heater operable with electricity from the generator;

switch means actuable in response to the amount of electricity created by the generator for applying electricity to said resistance heater;

thermal fluid heated by said resistance heater for storing wind power;

a heat exchanger utilizing the heated thermal fluid to create steam; and a steam-powered electricity generator for creating electricity with the steam during periods when wind speed can not create enough electricity to meet demand.

2. The system of claim 1 wherein said switch means applies electricity to said resistance heater when the generator is creating excess electricity.

3. The system of claim 2 wherein said switch means applies electricity to said resistance heater when the generator is creating less than a usable amount of electricity.

4. The system of claim 1 including an insulated tank for storing the heated thermal fluid.

5. The system of claim 4 wherein the thermal fluid circulates in a closed path from said resistance heater, to said storage tank, to said heat exchanger, and back to said resistance heater.

6. The system of claim 1 including a condenser creating free heat by converting the steam from said steam turbine generator into water.

7. The system of claim 6 wherein the water and steam circulate in a closed path from said heat exchanger, to said steam turbine generator, to said condenser, and back to said heat exchanger.

8. A wind energy storage and recovery device comprising:
   a wind-powered electricity generator;
   a heater operable with electricity from said generator;
   thermal fluid heated by said heater;
   a tank to store said heated thermal fluid;
   a heat exchanger for extracting heat energy from the stored thermal fluid; and
   a device for generating electricity with the extracted heat energy.

9. The storage and recovery device of claim 8 wherein said device for generating electricity comprises utilizing the extracted heat energy to create steam which operates a steam-powered electricity generator.

10. The storage and recovery device of claim 8 wherein said device for generating electricity creates alternating current electricity for application to an external load.

11. The storage and recovery device of claim 10 wherein said device for generating electricity includes first and second wind power collectors, said first wind power collector operating most efficiently at a relatively low wind speed to power said heater, said second wind power collector operating most efficiently at wind speeds greater than the relatively low wind speed to create alternating current electricity.

12. The storage and recovery device of claim 8 wherein thermal fluid leaving said heater enters said tank near a top of the tank.

13. The storage and recovery device of claim 12 wherein thermal fluid applied to said heat exchanger is removed from near the top of said tank.

14. The storage and recovery device of claim 13 including a pump for moving thermal fluid out of said heat exchanger and into said tank near the bottom of the tank.

15. The storage and recovery device of claim 14 including a second pump for moving thermal fluid out of the bottom of said tank to said heater.

16. A method for storing wind energy comprising the steps of:
   converting wind speed to electricity;
   converting electricity to heat;
   heating thermal fluid;
   storing the heated thermal fluid;
   extracting heat energy from the heated thermal fluid; and
   creating electricity with the extracted heat energy.

17. The method of claim 16 wherein the creating electricity step comprises:
   creating steam with the extracted heat energy; and
   generating electricity by applying the steam to a steam-powered electricity generator.

18. The method of claim 17 wherein converting wind speed to electricity further comprises converting wind speed to alternating current electricity for application to an external load.

19. The method of claim 17 including the step of condensing steam leaving the steam-powered electricity generator to create free heat.

20. The method of claim 16 wherein the creating electricity step comprises creating alternating current electricity.

* * * * *